US010125700B2

(12) United States Patent
Antcliff et al.

(10) Patent No.: US 10,125,700 B2
(45) Date of Patent: Nov. 13, 2018

(54) SYSTEM, METHOD, AND APPARATUS FOR MANAGING AFTERTREATMENT COMPONENT EFFICIENCY DURING MOTORING

(71) Applicant: Cummins Inc., Columbus, IN (US)

(72) Inventors: Timothy Lee Antcliff, Columbus, IN (US); Vijai Raghunathan, Columbus, IN (US); Norbert J. Rehm, IV, Trafalgar, IN (US); Vaibhav Daramwar, Columbus, IN (US); John C. Stetter, Columbus, IN (US); Mostafa M. Kamel, Columbus, IN (US)

(73) Assignee: Cummins Inc., Columbus, IN (US)

( * ) Notice: Subject to any disclaimer, the term of this patent is extended or adjusted under 35 U.S.C. 154(b) by 86 days.

(21) Appl. No.: 15/249,769

(22) Filed: Aug. 29, 2016

(65) Prior Publication Data

US 2016/0363064 A1    Dec. 15, 2016

Related U.S. Application Data

(63) Continuation of application No. PCT/US2015/018293, filed on Mar. 2, 2015.

(60) Provisional application No. 61/946,217, filed on Feb. 28, 2014.

(51) Int. Cl.
| | |
|---|---|
| *F01N 3/00* | (2006.01) |
| *F02D 41/00* | (2006.01) |
| *F01N 3/10* | (2006.01) |
| *F02D 41/12* | (2006.01) |

(52) U.S. Cl.
CPC ........... *F02D 41/005* (2013.01); *F01N 3/101* (2013.01); *F02D 41/0005* (2013.01); *F02D 41/123* (2013.01); *F02D 2041/0017* (2013.01); *Y02T 10/22* (2013.01); *Y02T 10/42* (2013.01); *Y02T 10/47* (2013.01)

(58) Field of Classification Search
USPC ......... 60/274, 277, 278, 285, 286, 295, 297, 60/301
See application file for complete search history.

(56) References Cited

U.S. PATENT DOCUMENTS

| | | | |
|---|---|---|---|
| 4,756,155 | A | 7/1988 | Shinzawa |
| 6,899,090 | B2 | 5/2005 | Arnold |
| 6,910,470 | B2 | 6/2005 | Blumenstock et al. |
| 6,973,786 | B1 | 12/2005 | Liu et al. |

(Continued)

FOREIGN PATENT DOCUMENTS

| | | |
|---|---|---|
| EP | 2131022 | 7/2011 |
| WO | 2003046354 | 6/2003 |
| WO | 2012150879 | 11/2012 |

OTHER PUBLICATIONS

International Search Report and Written Opinion, PCT/US2015/18293, dated Jun. 4, 2015,Cummins Inc., 9 pgs.
The State Intellectual Property Office of the People's Republic of China, First Office Action for corresponding Chinese patent application No. 201580011002.3 dated Jan. 22, 2018, 19 pgs.

(Continued)

*Primary Examiner* — Binh Q Tran
(74) *Attorney, Agent, or Firm* — Taft Stettinius & Hollister LLP

(57) ABSTRACT

There is disclosed system and methods that maintain efficiency of an aftertreatment component during a motoring event or condition of an internal combustion engine while also lowering oil consumption and particulate number emissions.

20 Claims, 3 Drawing Sheets

(56) References Cited

U.S. PATENT DOCUMENTS

| | | | |
|---|---|---|---|
| 7,261,098 B2 | 8/2007 | Vigild et al. | |
| 7,367,188 B2 | 5/2008 | Barbe et al. | |
| 7,801,669 B2 | 9/2010 | Nagae | |
| 7,836,693 B2 | 11/2010 | Fujita et al. | |
| 7,937,207 B2 * | 5/2011 | Nishiumi | F01N 3/0871 |
| | | | 123/568.21 |
| 8,001,953 B2 | 8/2011 | Murata et al. | |
| 8,037,675 B2 * | 10/2011 | Tahara | F01N 3/0253 |
| | | | 60/274 |
| 8,069,650 B2 | 12/2011 | Alm et al. | |
| 8,256,206 B2 * | 9/2012 | Wada | F01N 3/0842 |
| | | | 60/274 |
| 8,402,753 B2 * | 3/2013 | Ohashi | B01D 53/9409 |
| | | | 60/295 |
| 2008/0295514 A1 * | 12/2008 | Ono | F01N 3/035 |
| | | | 60/602 |
| 2010/0199639 A1 | 8/2010 | Matsunaga et al. | |
| 2010/0224174 A1 | 9/2010 | Tabata | |
| 2011/0010079 A1 | 1/2011 | Shutty et al. | |
| 2011/0054762 A1 | 3/2011 | Nakayama et al. | |
| 2013/0086887 A1 | 4/2013 | Bergland et al. | |
| 2015/0292423 A1 * | 10/2015 | Pohlkamp | F02D 41/0077 |
| | | | 701/22 |

OTHER PUBLICATIONS

The State Intellectual Property Office of the People's Republic of China, English Translation of Search Report for corresponding Chinese patent application No. 201580011002.3 dated Jan. 22, 2018, 2 pgs.

\* cited by examiner

SYSTEM, METHOD, AND APPARATUS FOR MANAGING AFTERTREATMENT COMPONENT EFFICIENCY DURING MOTORING

CROSS-REFERENCE TO RELATED APPLICATION:

The present application is a continuation of International PCT Application No. PCT/US2015/018293 filed on Mar. 2, 2015, which claims the benefit of the filing date of U.S. Provisional Application Ser. No. 61/946,217 filed on Feb. 28, 2014, each of which is incorporated herein by reference in its entirety.

BACKGROUND

A motoring event of an internal combustion engine can occur when fuel is not supplied to or combusted by cylinders of the internal combustion engine. Due to the reduced exhaust temperatures from lack of combustion, the temperature of aftertreatment components in the exhaust system reduces or cools at a rate or amount such that efficiency of the aftertreatment system is affected. When the motoring event concludes, the reduced temperature aftertreatment components operate with decreased efficiency, creating a potential for increased HC and/or NOx emissions until a desired operating temperature of the aftertreatment system is reached. Therefore, systems and methods are needed that maintain aftertreatment component efficiency during motoring conditions of an internal combustion engine.

SUMMARY

Various aspects of the systems and methods disclosed herein are contemplated. According to one aspect, a method includes determining an internal combustion engine motoring event is or is about to occur; performing a reduced intake air flow operation through the internal combustion engine in response to the motoring event to decrease a rate of cooling and oxygen saturation of an aftertreatment system component downstream of the internal combustion engine during the motoring event; and performing an increased exhaust gas recirculation (EGR) operation in response to the reduced intake air flow operation to maintain an intake manifold pressure above a predetermined threshold to reduce oil consumption during the motoring event.

According to another aspect, a system includes an engine connected to an aftertreatment system, an intake passage connected to the engine, and an EGR passage connecting an exhaust passage that receives exhaust gas from the engine to the intake passage. The intake passage includes an intake throttle and the EGR passage includes a control valve. The system further includes a controller connected to the intake throttle and the control valve.

According to the system, or in another aspect according to a controller apparatus, the controller is configured interpret a motoring condition of the internal combustion engine and to actuate the intake throttle to reduce intake air flow to reduce a rate of cooling of the aftertreatment component and actuate the control valve to increase EGR flow to maintain intake manifold pressure above a pressure threshold.

In one embodiment of the system and/or apparatus, increasing EGR flow maintains the intake manifold pressure above a pressure threshold so that oil consumption and particulate number emissions during the motoring event or condition are lower than would occur under no EGR flow conditions. In another embodiment, the intake throttle in the intake passage is closed to reduce the intake air flow, which reduces the rate of cooling and oxygen saturation of the aftertreatment system component. In yet another embodiment, increasing the EGR flow includes opening the control valve. In a further embodiment, the motoring event or condition includes determining that one or more cylinders of the internal combustion engine is not presently receiving fuel. In still another embodiment, the internal combustion engine is returned to nominal air flow operation in response to determining an end of the motoring event or condition.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
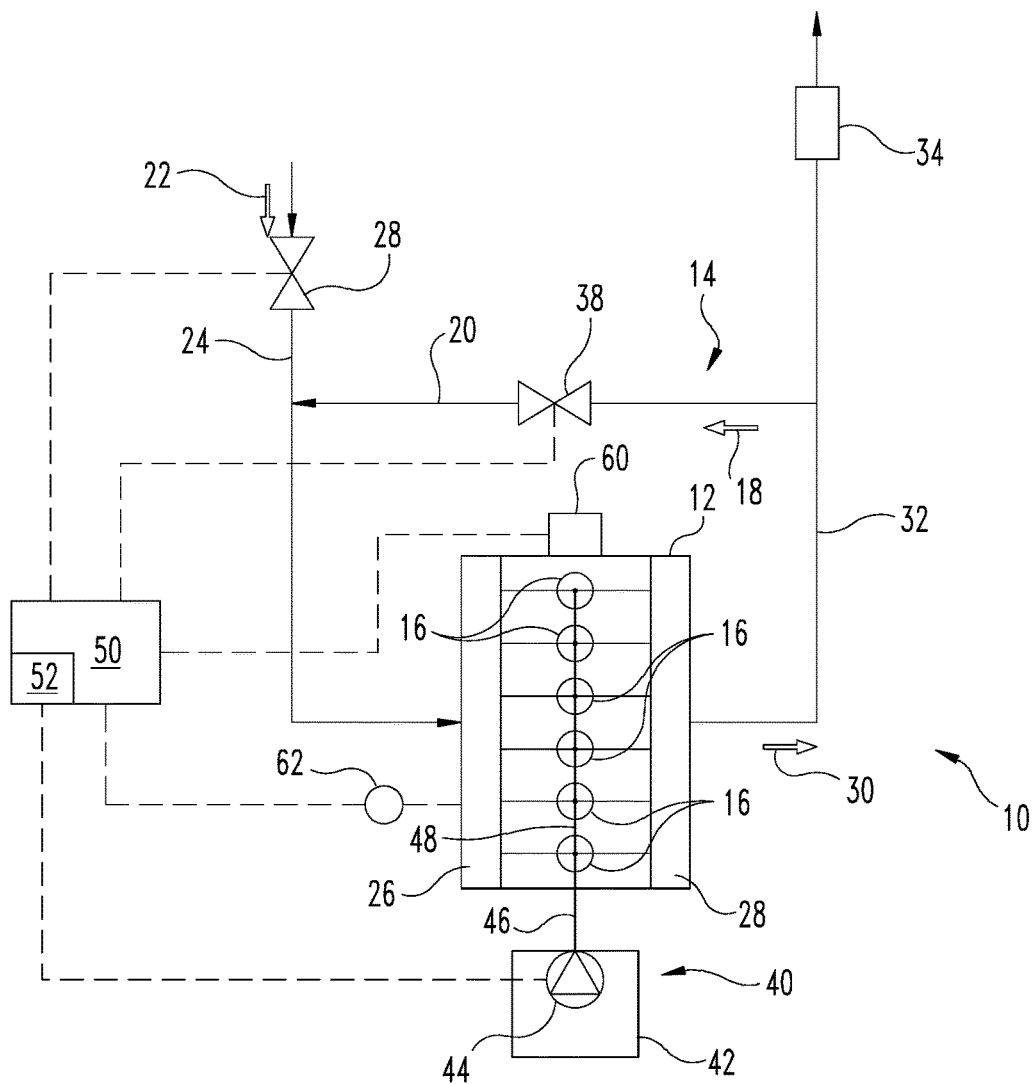
FIG. 1 is a schematic depiction of one embodiment of a system having an internal combustion engine and aftertreatment component efficiency management system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 10 is depicted having an engine 12. The engine 12 is an internal combustion engine of any type, and can include a stoichiometric engine, a diesel engine, a gasoline engine, and/or a natural gas engine. In certain embodiments, the engine 12 includes a lean combustion engine such as a lean burn gasoline engine or a diesel cycle engine. In certain embodiments, the engine 12 may be any engine type producing emissions that may include an exhaust gas recirculation (EGR) system or loop 14, for example to reduce $NO_x$ emissions from the engine 12. The engine 12 includes a number of cylinders 16. The number of cylinders may be any number suitable for an engine, and the arrangement may be any arrangement suitable arrangement. The engine 12 includes an inline 6 cylinder arrangement for illustration purposes only, but other arrangements are also contemplated and not precluded.

In the system 10, an EGR flow 18 recirculates in an EGR passage 20 and combines with intake flow 22 in an intake passage 24 at a position upstream of an intake manifold 26. Intake manifold 26 provides a charge flow including the intake flow 22 combined with EGR flow 18. Intake manifold 26 is connected to intake passage 24, and intake passage 24 includes an intake throttle 28 to regulate the charge flow to cylinders 16 through intake manifold 26. Intake passage 24 may also include a charge air cooler (not shown) to cool the charge flow provided to intake manifold 26. Intake passage 24 may also include a compressor (not shown) to compress the intake air flow received from an intake air cleaner (not shown.) Embodiments without a compressor and/or charge air cooler are also contemplated.

The EGR flow 18 may combine with the intake flow 22 at an outlet of EGR passage 20, at a mixer, or by any other arrangement. In certain embodiments, the EGR flow 18 returns to the intake manifold 26 directly. Intake throttle 28 is in intake passage 24 upstream of EGR passage 20 and includes a plate or other suitable structure in intake passage 24 to regulate the amount of intake flow 22 provided to intake manifold 26. Intake throttle 28 may include an actuator or other device connected to a controller 50 that is configured to receive control commands from controller 50 that regulate the intake flow 22 by modulating the plate or other flow obstructing member of intake throttle 28 in intake passage 24.

In the illustrated embodiment, EGR flow 18 mixes with the intake flow 22 downstream of intake throttle 28 so that intake manifold pressure on intake manifold 26 can be increased by increasing EGR flow 18 in response to a reduction of intake flow 22 through intake throttle 28, which reduces oil consumption of engine 12 during motoring conditions. In other embodiments, EGR passage 20 can include an EGR cooler (not shown) and a bypass (not shown) with a valve that selectively allows EGR flow to bypass the EGR cooler. The presence of an EGR cooler and/or an EGR cooler bypass is optional and non-limiting.

EGR passage 20 further includes an EGR flow control valve 38 that is operable to be moved between an open position and a closed position to regulate the amount of EGR flow 18 that is provided to intake passage 24. Control valve 38 can be binary in that it only has an "on" position and an "off" position, may be positionable at a selected one of a plurality of positions between the on and off positions, and/or may be continuously variable between the on and off positions. Control valve 38 includes an actuator or other suitable device to regulate its opening and closing that is connected to and is responsive to control commands from controller 50.

Cylinders 16 are connected to an exhaust system that includes an exhaust manifold 28 that receives exhaust gases in the form of an exhaust flow 30 from cylinders 16 and an exhaust passage 32 that receives exhaust gas flow 30 from exhaust manifold 28. In other embodiments, a turbine (not shown) in exhaust passage 32 is provided that is operable via the exhaust gases to drive a compressor in intake passage 24. Exhaust passage 32 includes an aftertreatment system 34 with one or more components in exhaust passage 32 that is configured to treat emissions in the exhaust gas flow 30. The aftertreatment system 34 may be any type of aftertreatment system known in the art, and may include a catalytic and/or filtration aftertreatment component. The aftertreatment system 34 includes one or more components that require, at least in some operating conditions, a minimal temperature to function properly, to function efficiently, and/or to regenerate or recover storage capacity or catalytic activity. Example aftertreatment components include, without limitation, oxidation catalysts (e.g. a diesel oxidation catalyst—DOC), $NO_x$ treatment components (three-way catalyst, lean $NO_x$ catalyst, SCR catalyst, etc.), a filtration component, a cleanup catalyst (e.g. an ammonia oxidation catalyst).

System 10 further includes a fuel system 40 that is operable to provide fuel from a fuel storage source 42, such as a fuel tank, to cylinders 16. The fuel storage source 42 includes, for example, an onboard fuel pump 44 which delivers fuel from the source 42 via a conduit 46 through a filter (not shown) to a common supply rail 48. The common rail 48 feeds fuel via respective fuel lines to a plurality of fuel injectors (not shown), at least one per cylinder 16. The fuel pump 44 is operated through a relay or other suitable connection to controller 50 to provide a fuelling amount in response to a fuelling command.

A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder. In certain embodiments, the direct injector may be structured to inject fuel into a combustion pre-chamber. The direct injectors may be the primary or the only fueling device for the cylinders 16, or alternatively the direct injectors may be an auxiliary or secondary fueling device for the cylinders 16. In certain embodiments, the direct injectors are capable of providing all of the designed fueling amount for the cylinders 16 at any operating condition. Alternatively, the direct injectors may be only partially capable, for example the direct injectors may be capable of providing a designated amount of fuel for a specific purpose.

In still other embodiments, cylinders 16 include a port injector (not shown) in addition to or alternatively to direct injectors. In these embodiments, the intake manifold 26 may be divided (not shown), or the port fuel injectors may be positioned such that no other cylinder in the system 10 is downstream of the port fuel injector, i.e. only the target cylinder is downstream of the port fuel injector.

The fuel supply to the combustion chamber of each cylinder is controlled by a fuel control module 52 that is a separate controller or a part of controller 50. Fuel control module 52 operates the injectors according to a fuel command produced by controller 50 in response to engine operating conditions. The controller 50 is connected to the fuel pump 44 and to a plurality of other engine condition sensors shown schematically as sensor 60. The engine condition sensors 60 may include, but are not limited to, sensors which monitor engine position, engine speed, manifold static pressure, mass air flow into the manifold, engine temperature, air temperature, cam shaft position (inlet and exhaust), inlet manifold tuning valves, barometric pressure, EGR amount, VGT position, torque demand, gear position, etc. In addition, at least one intake manifold pressure sensor 62 is provided at intake manifold 26 that is operable to provide a signal indicative of the intake manifold pressure of the combined cylinders 16 and/or for each of the cylinders 16.

In certain embodiments, the system 10 includes a controller 50 structured to perform certain operations to control an efficiency of aftertreatment system 34 during a motoring event or condition of engine 12. In certain embodiments, the controller 50 forms a portion of a processing subsystem including one or more computing devices having memory, processing, and communication hardware. The controller 50 may be a single device or a distributed device, and the functions of the controller 50 may be performed by hardware or software. The controller 50 may be included within, partially included within, or completely separated from an engine controller (not shown). The controller 50 is in communication with any sensor or actuator throughout the system 10, including through direct communication, communication over a datalink, and/or through communication with other controllers or portions of the processing subsystem that provide sensor and/or actuator information to the controller 50.

In certain embodiments, the controller 50 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Certain systems are described following, and include examples of controller operations and procedures in various contexts of the present disclosure. In certain embodiments, the controller 50 interprets a motoring condition or event of engine 12, and in response to the motoring condition or event, the controller 50 provides an aftertreatment component efficiency maintenance command that closes intake throttle 28 to reduce or cut intake flow 22 to one or more of cylinders 16. The motoring condition or event includes any condition or event understood in the art that may indicate that engine 12 is operating in a motoring condition or that a motoring condition is imminent such that an undesired amount of cooling of aftertreatment system 34 and/or one or more of its components will or potentially occur under present intake flow conditions.

Figure 2:
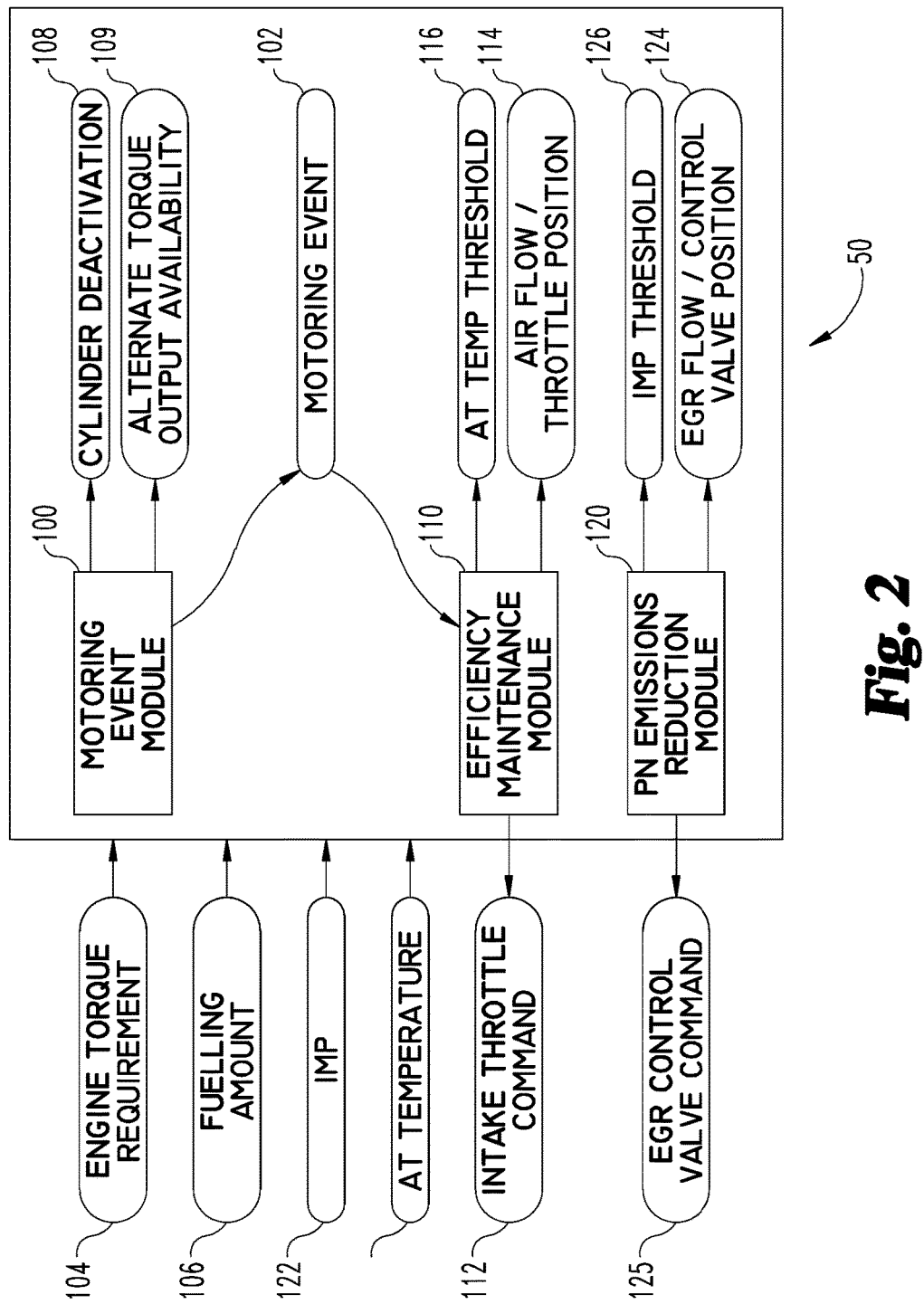
FIG. 2 is a schematic depiction of one embodiment of a controller apparatus for managing efficiency of an internal combustion engine aftertreatment system.

An example system includes controller 50 having modules structured to perform operations to reduce intake air flow in response a motoring condition of the engine 12. An example apparatus for controller 50 in FIG. 2 includes a motoring event module 100 structured to interpret a motoring event 102 of the internal combustion engine in response to an engine torque requirement 104 and/or a fuelling amount 106 provided to cylinders 16. The engine torque requirement 104 is ordinarily the current output of the speed/torque governor for the engine, although in a hybrid system the presence and capability of alternate torque sources could also be considered to determine whether the engine is required to provide torque. The motoring event module 100 could also be configured to determine whether the engine is required to provide zero (or less) torque under the present operating conditions, whether the engine is not presently injecting fuel, and/or whether the engine is "motoring."

The exemplary controller 50 further includes an aftertreatment component efficiency maintenance module 110. The efficiency maintenance module 110 can be configured to provide an intake throttle command 112 to close the intake throttle 28 in response to the motoring event 102 to reduce the amount of air that is pushed through the aftertreatment system 34 via intake flow 22. The reduced air flow reduces the amount of heat lost by the aftertreatment system 34 and reduces the amount of oxygen that is stored in any catalyst component of aftertreatment system 34. An example embodiment aftertreatment system 34 includes, for example, a three way catalyst that becomes less efficient at converting NOx and HC emissions as it cools. The amount of cool air that travels through the catalyst is reduced by closing the intake throttle 28 during the motoring event 102. In one embodiment, a table, chart or formula for air flow/throttle position 144 provides an intake air flow amount for various intake throttle positions at certain operating conditions. In addition, if intake air flow continues at a rate that existed just prior to the motoring event 102, the catalyst can be saturated with oxygen, further reducing the ability of the catalyst to convert NOx emissions. By reducing intake air flow 22 through the aftertreatment system 34, the catalyst remains capable of converting NOx emissions at a desired level for a longer period of time.

An exemplary controller 50 may further include particulate number emissions reduction module 120 that is further configured to interpret an intake manifold pressure 122 during the motoring event 102 and, in response to the reduced intake air flow reducing the intake manifold pressure below a pressure threshold 126, provide an EGR control valve command 122 increase EGR flow 18 to maintain pressure of intake manifold 26 above a predetermined pressure threshold 126 that reduces or provides an acceptable amount of oil consumption and/or maintains particulate number emissions below an acceptable threshold during the motoring event 102. Opening the EGR control valve 38 during the motoring event increases the intake manifold pressure, which in turn reduces oil consumption and particle number emissions. Modulation of EGR control valve 38 can be performed with feedback control from intake manifold pressure sensor 48 or by any suitable control scheme. For example, a table, chart or formula can be provided that includes EGR flow/control valve position 124 and corresponding EGR flows that occur in response to the control valve position under certain operating conditions.

In one embodiment, the system and method includes determining a motoring event 102 indicative of a motoring condition of operation of engine 12. For an engine 12 with controller 50 configured to deactivate one or more cylinders 16 by cutting fuelling, a motoring event 102 can be determined in response to a cylinder deactivation 108 resulting from deactivation of fuelling to one or more of cylinders 16, or deactivation of fuelling to all cylinders 16. An example controller and procedure further include determining a motoring event when the engine fueling requirement is zero by determining that an engine torque requirement is zero or negative, by determining that the engine is not presently injecting fuel, and/or determining an alternative torque output availability 109 from another torque supplier coupled to the vehicle powertrain that is capable of supplying a full torque amount in lieu of the engine.

In one embodiment a controller and/or procedure includes an operation to perform a reduced air flow operation through the engine 12 in response to a motoring event indication. The operation to perform the reduced air flow operation may further include a temperature of the aftertreatment system 34 or component thereof, or a temperature indicative of the aftertreatment system 34 or component thereof, falling below a first value of an aftertreatment temperature threshold 116. The operation to perform the reduced air flow operation may further include closing an intake throttle 28 in the intake passage 24. Certain further embodiments of the procedure include an operation to return the engine 12 to nominal air flow operations by opening the intake throttle 28 in response to the motoring event conclusion and/or the aftertreatment temperature indicating a temperature rising above a second value for aftertreatment temperature threshold 116, where the second threshold value is greater than the first threshold value.

Figure 3:
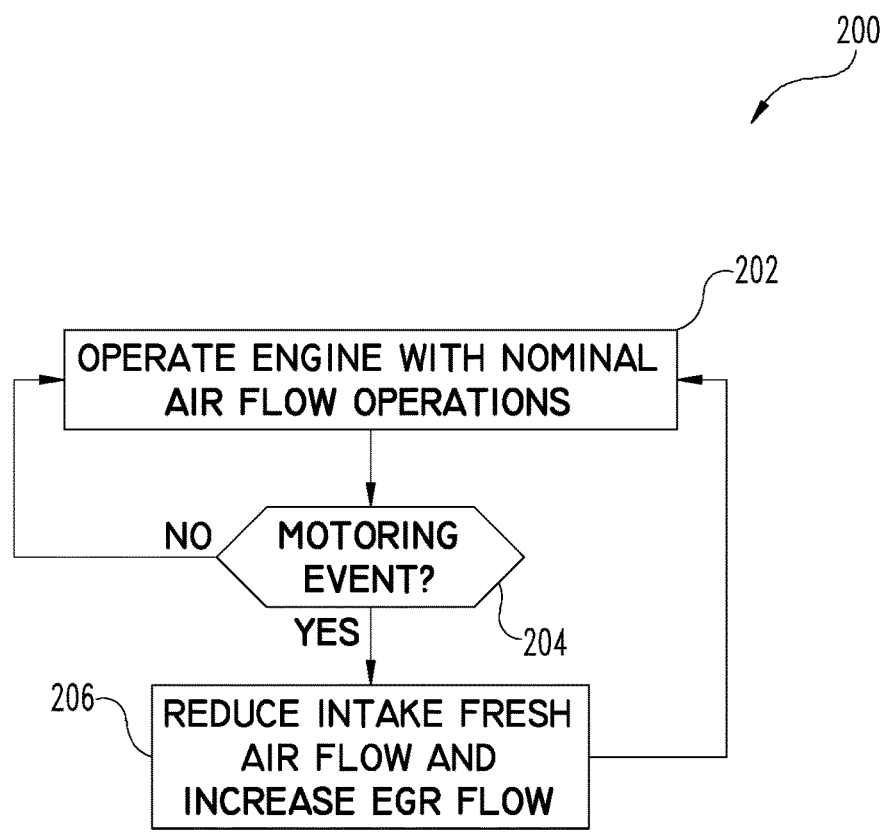
FIG. 3 is a flow diagram of one embodiment of a procedure for managing efficiency of an internal combustion engine aftertreatment system.

Referring to FIG. 3, one embodiment of a procedure 200 is shown. Procedure 200 includes an operation 202 to operate the engine with nominal air flow operations in the intake system and EGR system. During operation of the engine, one or more systems are monitored to determine whether a conditional 204 indicating a motoring event is satisfied. If conditional 204 is negative, procedure 200 returns to operation 202. If conditional 204 is positive, procedure 200 continues at operation 206. At operation 206, procedure 200 includes an operation to reduce the intake fresh air flow and to increase the EGR flow. The intake fresh air flow can be reduced by closing the intake throttle in the intake passage, and the EGR flow can be increased by opening the EGR valve in the EGR passage In a further embodiment a controller and/or procedure includes an operation to perform an increased EGR flow operation to the intake manifold 26 in response to the reduced air flow operation through the engine 12. The operation to increase EGR flow maintains or increases the pressure of the intake manifold 26 above a intake manifold pressure threshold 126 that provides an acceptable rate of oil consumption and amount of particulate number emissions. In certain embodiments the operation to increase EGR flow includes opening EGR control valve 38 to provide sufficient EGR flow to maintain intake manifold pressure above an intake manifold pressure threshold 126 in response to closing of intake throttle 28.

Various aspects of the present disclosure are contemplated. For example, according to one aspect, a method includes determining a motoring event for an internal combustion engine while operating the internal combustion engine with a nominal fresh air flow and a nominal EGR flow; in response to the motoring event, performing a reduced intake air flow operation to reduce a fresh air flow through the internal combustion engine from the nominal fresh air flow, where the reduced intake air flow operation decreases a rate of cooling of and oxygen saturation of an aftertreatment system component downstream of the internal combustion engine during the motoring event; and performing an increased EGR operation during the motoring event to increase an EGR flow from the nominal EGR flow and maintain an intake manifold pressure above a predetermined threshold.

In one embodiment, performing the increased EGR operation lowers oil consumption and particulate number emissions during the motoring event below amounts that would occur with no EGR flow. In another embodiment, performing the reduced intake air flow operation includes closing an intake throttle in an intake passage connected to the internal combustion engine. In a further embodiment, the oil consumption varies inversely with the intake manifold pressure during operation of the internal combustion and particulate numbers emissions vary directly with oil consumption.

According to another embodiment of the method, performing the increased EGR operation includes opening an EGR valve in an EGR passage connected to an intake passage that is connected to the internal combustion engine. In another embodiment, determining the motoring event includes determining that the internal combustion engine is not presently receiving fuel. In yet another embodiment, the method includes returning operating the internal combustion engine with the nominal fresh air flow and the nominal EGR flow in response to determining an end of the motoring event.

In another embodiment of the method, determining the motoring event includes determining a torque requirement for the internal combustion engine is zero or less. In still another embodiment, determining the motoring event includes determining fuelling to one or more cylinders of the internal combustion engine is deactivated.

According to another aspect, a system includes an engine coupled to an aftertreatment system with an exhaust passage and an intake passage coupled to the engine, that includes an intake throttle. The system also includes an EGR passage connecting the exhaust passage that receives exhaust gas from the engine to the intake passage, the EGR passage including a control valve and a controller operably connected to the intake throttle and the control valve. The controller is configured interpret a motoring event of the engine and, in response to the motoring event, close the intake throttle to reduce a fresh air flow through the engine from the intake passage and to open the control valve during the motoring event to increase an EGR flow to the intake passage.

In one embodiment, the system includes an intake manifold pressure sensor operably connected to the controller, and the controller is configured to actuate the control valve to increase the EGR flow when the intake manifold pressure is less than a threshold intake manifold pressure during the motoring event.

In another embodiment, the controller includes a motoring event module structured to interpret the motoring event in response to at least one of an engine torque requirement and a fuelling amount provided to the engine. In a refinement of this embodiment, the controller includes an aftertreatment component efficiency maintenance module structured to provide an intake throttle command that closes the intake throttle in response to the motoring event. In a further refinement, the controller is configured to close the intake throttle to reduce the fresh air flow to reduce cooling and oxygen saturation of the aftertreatment system. In still another further refinement, the aftertreatment system includes a three-way catalyst.

In a further embodiment, the controller includes a particulate number emissions reduction module that is structured to interpret an intake manifold pressure of an intake manifold of the engine during the motoring event and provide an EGR control valve command to increase the EGR flow and maintain the intake manifold pressure above a predetermined threshold. In refinement of this embodiment, opening the EGR control valve during the motoring event reduces oil consumption of the engine and reduces particle number emissions from the engine.

According to another aspect, an apparatus includes a controller operably connected to an internal combustion engine having an aftertreatment system. The controller is further operably connected to an intake throttle of an intake system to the internal combustion engine and to an EGR control valve of an EGR system connected to the intake system. The controller includes a plurality of modules, including a motoring event module structured to interpret a motoring event in response to at least one of an engine torque requirement and a fuelling amount provided to the internal combustion engine, an aftertreatment component efficiency maintenance module structured to provide an intake throttle command that closes the intake throttle in response to the motoring event, and a particulate number emissions reduction module that is structured to interpret an intake manifold pressure of an intake manifold of the internal combustion engine during the motoring event and to provide an EGR control valve command to increase the EGR flow to maintain the intake manifold pressure above a predetermined threshold during the motoring event.

In one embodiment, closing the intake throttle to reduce the fresh air flow during the motoring event reduces cooling and oxygen saturation of the aftertreatment system as compared to not closing the intake throttle, and opening the EGR control valve during the motoring event reduces oil consumption of the internal combustion engine and particle number emissions from the internal combustion engine as compared to not opening the EGR control valve. In another embodiment, the motoring event module is structured to interpret the motoring event in response to at least one of the engine torque requirement and the fuelling amount being zero or less.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for operating a vehicle during a motoring event, comprising:
   determining, with a controller operably connected to the vehicle, a motoring event for an internal combustion engine in response to at least one of an engine torque requirement and a fuelling amount provided to the internal combustion engine while operating the internal combustion engine with a nominal fresh air flow and a nominal exhaust gas recirculation (EGR) flow;
   in response to the motoring event, performing, with the controller, a reduced intake air flow operation to reduce a fresh air flow through the internal combustion engine from the nominal fresh air flow, wherein the reduced intake air flow operation decreases a rate of cooling of and oxygen saturation of an aftertreatment system component downstream of the internal combustion engine during the motoring event; and
   performing, with the controller, an increased EGR operation during the motoring event to increase an EGR flow from the nominal EGR flow and maintain an intake manifold pressure above a predetermined threshold.

2. The method of claim 1, wherein performing the increased EGR operation lowers oil consumption and particulate number emissions during the motoring event below amounts that would occur with no EGR flow during the motoring event.

3. The method of claim 1, wherein performing the reduced intake air flow operation includes closing an intake throttle in an intake passage connected to the internal combustion engine.

4. The method of claim 1, wherein oil consumption varies inversely with the intake manifold pressure during operation of the internal combustion and particulate numbers emissions vary directly with oil consumption.

5. The method of claim 1, wherein performing the increased EGR operation includes opening an EGR valve in an EGR passage connected to an intake passage that is connected to the internal combustion engine.

6. The method of claim 1, wherein determining the motoring event includes determining that the internal combustion engine is not presently receiving fuel.

7. The method of claim 1, further comprising returning operating the internal combustion engine with the nominal fresh air flow and the nominal EGR flow in response to determining an end of the motoring event.

8. The method of claim 1, wherein determining the motoring event includes determining a torque requirement for the internal combustion engine is zero or less.

9. The method of claim 1, wherein determining the motoring event includes determining fuelling to one or more cylinders of the internal combustion engine is deactivated.

10. A system, comprising:
    an engine coupled to an aftertreatment system with an exhaust passage;
    an intake passage coupled to the engine, the intake passage including an intake throttle; an exhaust gas recirculation (EGR) passage connecting the exhaust passage that receives exhaust gas from the engine to the intake passage, the EGR passage including a control valve; and
    a controller operably connected to the intake throttle and the control valve, wherein the controller is configured interpret a motoring event of the engine in response to at least one of an engine torque requirement and a fuelling amount provided to the internal combustion engine and, in response to the motoring event, close the intake throttle to reduce a fresh air flow through the engine from the intake passage and to open the control valve during the motoring event to increase an EGR flow to the intake passage.

11. The system of claim 10, further comprising an intake manifold pressure sensor operably connected to the controller and wherein the controller is configured to actuate the control valve to increase the EGR flow when the intake manifold pressure is less than a threshold intake manifold pressure during the motoring event.

12. The system of claim 10, wherein the controller includes a motoring event module structured to interpret the motoring event in response to at least one of an engine torque requirement and a fuelling amount provided to the engine.

13. The system of claim 12, wherein the controller includes an aftertreatment component efficiency maintenance module structured to provide an intake throttle command that closes the intake throttle in response to the motoring event.

14. The system of claim 13, wherein closing the intake throttle to reduce the fresh air flow reduces cooling and oxygen saturation of the aftertreatment system.

15. The system of claim 14, wherein the aftertreatment system includes a three-way catalyst.

16. The system of claim 13, wherein the controller includes a particulate number emissions reduction module that is structured to interpret an intake manifold pressure of an intake manifold of the engine during the motoring event and provide an EGR control valve command to increase the EGR flow and maintain the intake manifold pressure above a predetermined threshold.

17. The system of claim 16, wherein opening the EGR control valve during the motoring event reduces oil consumption of the engine and reduces particle number emissions from the engine.

18. An apparatus. comprising:
a controller operably connected to an internal combustion engine having an aftertreatment system, the controller further being operably connected to an intake throttle of an intake system to the internal combustion engine and to an exhaust gas recirculation (EGR) control valve of an EGR system connected to the intake system, the controller including a plurality of modules, the plurality of modules including:
a motoring event module structured to interpret a motoring event in response to at least one of an engine torque requirement and a fuelling amount provided to the internal combustion engine;
an aftertreatment component efficiency maintenance module structured to provide an intake throttle command that closes the intake throttle in response to the motoring event; and
a particulate number emissions reduction module that is structured to interpret an intake manifold pressure of an intake manifold of the internal combustion engine during the motoring event and to provide an EGR control valve command to increase the EGR flow to maintain the intake manifold pressure above a predetermined threshold during the motoring event.

19. The apparatus of claim 18, wherein closing the intake throttle to reduce the fresh air flow during the motoring, event reduces cooling and oxygen saturation of the aftertreatment system as compared to not closing the intake throttle, and opening the EGR control valve during the motoring event reduces oil consumption of the internal combustion engine and particle number emissions from the internal combustion engine as compared to not opening the EGR control valve.

20. The apparatus of claim 18, wherein the motoring event module is structured to interpret the motoring event in response to at least one of the engine torque requirement and the fuelling amount being zero or less.

* * * * *